US012626571B2

(12) United States Patent
    Subramany

(10) Patent No.: US 12,626,571 B2
(45) Date of Patent: May 12, 2026

(54) SYSTEM AND METHOD FOR PROPERTY MONITORING

(71) Applicant: SimpliSafe, Inc., Boston, MA (US)

(72) Inventor: Rahul Subramany, Boston, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 19/074,826

(22) Filed: Mar. 10, 2025

(65) Prior Publication Data

US 2025/0259521 A1     Aug. 14, 2025

Related U.S. Application Data

(63) Continuation of application No. 18/933,433, filed on Oct. 31, 2024, which is a continuation of application No. 18/243,191, filed on Sep. 7, 2023, now Pat. No. 12,223,813, which is a continuation of application No. 17/529,332, filed on Nov. 18, 2021, now Pat. No. 11,790,743.

(Continued)

(51) Int. Cl.
    *G08B 13/196*      (2006.01)
    *G06V 20/52*       (2022.01)
    *G08B 25/00*       (2006.01)

(52) U.S. Cl.
    CPC ....... *G08B 13/19697* (2013.01); *G06V 20/52* (2022.01); *G08B 13/19602* (2013.01); *G08B 25/008* (2013.01); *G06F 2218/12* (2023.01)

(58) Field of Classification Search
    CPC ........ G08B 13/19697; G08B 13/19602; G08B 25/008; G06V 20/52
    See application file for complete search history.

(56) References Cited

U.S. PATENT DOCUMENTS

| 10,186,124 B1 | 1/2019 | Mullins |
| 10,657,795 B1 | 5/2020 | Laurans et al. |

(Continued)

FOREIGN PATENT DOCUMENTS

| CN | 110139598 A | 8/2019 |
| CN | 110933955 A | 3/2020 |

(Continued)

OTHER PUBLICATIONS

International Search Report and Written Opinion issued Nov. 28, 2022 for International Patent Application No. PCT/US2021/059844.

(Continued)

*Primary Examiner* — Quan Zhen Wang
*Assistant Examiner* — Mancil Littlejohn, Jr.
(74) *Attorney, Agent, or Firm* — Pierce Atwood LLP

(57)     ABSTRACT

An outdoor camera integrated into an alarm system for property monitoring, configured to monitor a property. The alarm system can have a base station that communicates with all the components of the alarm system, such as an outdoor camera, which can be equipped with an imaging sensor and software capabilities to conduct analysis on data collected by the outdoor camera to determine information about a human or non-human visitor at the property. The outdoor camera provides information about detected events at the property to the base station, where the data can be used to take appropriate action at the property and communicate with either the user or a monitoring service.

19 Claims, 4 Drawing Sheets

Related U.S. Application Data

(60) Provisional application No. 63/115,798, filed on Nov. 19, 2020.

(56) References Cited

U.S. PATENT DOCUMENTS

| | | | |
|---|---|---|---|
| 11,523,485 B1 | 12/2022 | Fu et al. | |
| 11,792,455 B1 | 10/2023 | Fu et al. | |
| 2006/0072014 A1 | 4/2006 | Geng et al. | |
| 2007/0182540 A1 | 8/2007 | Marman | |
| 2007/0262857 A1 | 11/2007 | Jackson | |
| 2015/0109112 A1* | 4/2015 | Fadell | G08B 19/005 |
| | | | 340/328 |
| 2015/0248642 A1* | 9/2015 | Florance | H04W 4/029 |
| | | | 705/313 |
| 2017/0220872 A1* | 8/2017 | Child | G08B 13/196 |
| 2019/0082115 A1 | 3/2019 | Takahashi et al. | |
| 2019/0164019 A1 | 5/2019 | Djiofack | |
| 2020/0226416 A1 | 7/2020 | Bapat et al. | |
| 2020/0320838 A1 | 10/2020 | Trundle et al. | |
| 2020/0327682 A1 | 10/2020 | Nater et al. | |
| 2021/0012115 A1* | 1/2021 | Bodbyl | G06V 20/176 |
| 2021/0274130 A1 | 9/2021 | Nodder | |
| 2022/0207972 A1 | 6/2022 | Madden et al. | |

FOREIGN PATENT DOCUMENTS

| | | | |
|---|---|---|---|
| EP | 2407944 A1 | 1/2012 | |
| KR | 20200021841 A | 3/2020 | |
| WO | WO-2021011137 A1 * | 1/2021 | G06V 20/39 |
| WO | WO-2021153115 A1 * | 8/2021 | G08B 25/00 |

OTHER PUBLICATIONS

Office Action issued Dec. 13, 2023 for Chinese Patent Application No. 202180077489.0.

Office Action mailed Sep. 23, 2024 for European Patent Application No. 21827280.5.

Written Opinion of the International Preliminary Examining Authority issued Mar. 20, 2023 for International Patent Application No. PCT/US2021/059844.

* cited by examiner

SYSTEM AND METHOD FOR PROPERTY MONITORING

RELATED APPLICATIONS

This application is a continuation of and claims the benefit under 35 U.S.C. § 120 to U.S. application Ser. No. 18/933,433, entitled SYSTEM AND METHOD FOR PROPERTY MONITORING, filed Oct. 31, 2024, which is a continuation of and claims the benefit under 35 U.S.C. § 120 to U.S. application Ser. No. 18/243,191, entitled SYSTEM AND METHOD FOR PROPERTY MONITORING, filed Sep. 7, 2023, and now U.S. Pat. No. 12,223,813, which is a continuation of and claims the benefit under 35 U.S.C. § 120 to U.S. application Ser. No. 17/529,332, entitled SYSTEM AND METHOD FOR PROPERTY MONITORING, filed Nov. 18, 2021, and now U.S. Pat. No. 11,790,743, which claims the benefit under 35 U.S.C. § 119 (e) of U.S. Provisional Application Ser. No. 63/115,798, entitled SYSTEM AND METHOD FOR PROPERTY MONITORING, filed Nov. 19, 2020, the entire contents of each of which are incorporated herein by reference for all purposes.

FIELD

Disclosed embodiments are related to property monitoring technology and related methods of use.

BACKGROUND

Many homes and businesses are equipped with surveillance systems for monitoring the property with respect to various conditions such as unauthorized entry through doors and/or windows, fire or smoke conditions, movement in a room or around a building, etc.

SUMMARY

Systems and methods described herein provide the ability to automate the detection and emergency response of a property alarm system to reduce the overall operational costs associated with the manual or human review of detected events at a monitoring site. Outdoor sensors associated with an alarm system typically detect significantly higher volumes of events than indoor sensors. For example, an outdoor camera may detect neighbors passing by the property, delivery personnel entering and exiting the property, or canvassers, as well as non-human objects at the property, such as debris blown through by wind, wild animals and/or pets. In cases where outdoor sensors do not conduct preliminary review of events locally at the monitoring site, information, such as still images, video, and/or audio, may be relayed to an external monitoring center, where the information is manually reviewed. As a result of the high volume of information requiring rapid review, there may be high operational costs associated with alarm systems having outdoor sensors, such as one or more cameras. In some embodiments, an alarm system sensor, such as an outdoor camera, can perform automated or computer-based preliminary review of detected events captured in data such as still images, video, and/or audio, using software capabilities including artificial intelligence analysis. Automated or computer-based analysis or other processing of the information collected from an outdoor sensor can reduce the total number of events and/or the number of false positive detected events reported to the user and/or the monitoring servers, thus reducing the number of events a user or professional staff must manually review to determine an appropriate course of action (for example, communicating with local authorities).

In some embodiments, an alarm system includes an outdoor camera configured to generate monitoring data from a property using an image sensor and capable of collecting and analyzing the data. The alarm system may also include a base station configured to communicate with the outdoor camera, the user of the alarm system, and/or a monitoring server which may monitor the property in the absence of or in addition to the user. The base station may be configured in an armed or a disarmed mode, e.g., during which the base station can enter an alarm state based on various sensor conditions such as opening of a door while the door is locked. When the base station is in an armed (or disarmed) mode, the outdoor camera can monitor an outdoor area, detect motion in the area, and in response capture image and/or audio data and analyze the data according to various criteria. (As used herein, video data refers to data including still images, multiple or moving image data, and/or audible or sound information.) In some embodiments, the criteria and/or actions taken by the camera based on the analysis can depend on whether the alarm system is in an armed or disarmed mode. In some embodiments, the camera can identify whether detected motion is that of a human, e.g., if the alarm system is in an armed mode the camera may attempt to identify whether detected motion is that of a human, whereas if the alarm system is in a disarmed mode the camera may not analyze detected motion at all. If the detected motion is caused by a human, the camera and/or base station can send an alert to a user and/or a monitoring server as well as begin recording video data of the detected human and/or displaying a countdown chime or siren that is audible in the area around the detected human. A user can be given a threshold period of time to respond to the alert, such as by dismissing or canceling the alert, disarming the alarm system via user app and/or keypad at the property, requesting video data from the camera regarding the human, requesting to communicate via audio/video with the person, etc. Where the user can communicate with people at the property, the camera or other portions of the alarm system can have a video and/or audio display to facilitate communication. If the user fails to respond within the threshold, the monitoring server may prompt monitoring personnel to review the video data, attempt to communicate with the human at the property, and/or notify authorities such as the police. In some cases, if the camera detects a human, the camera can analyze the video data of the human in an attempt to recognize the human, e.g., by facial or voice recognition, etc., or the camera can take steps to recognize the human in other ways that do not involve video data analysis, such as by detecting that an authorized person's phone or other device is located within a particular distance of the property (e.g., using geofencing). If the human is recognized as a homeowner or other person authorized to be at the property, the camera can prompt the alarm system to use an extended time for the threshold period of time to allow a user to respond to an alert. This may provide the recognized homeowner with extended time to enter the building and disarm the alarm. Alternately, if the person is not recognized as authorized to be at the property, the shorter threshold period of time may be employed before an alert is sent.

In some embodiments, an outdoor camera can be integrated into an alarm system including indoor sensors, e.g., to detect window and door opening, glass breakage, etc. and other components. Operation of the outdoor camera and indoor sensors and other alarm system components can be coordinated, e.g., by the alarm system base station, so that indoor and/or outdoor sensors operate based on conditions sensed at outdoor and/or indoor locations. For example, if the outdoor camera detects human motion near a back door of the building, the base station can employ indoor sensors at the rear of the building to monitor for unauthorized entry and/or to follow the movements of the human into and through the building. In addition, or alternately, the base station can use an alarm siren to display a noise or audible message to the human at the back door to vacate the premises or otherwise discourage the human from entering the building. As another example, if indoor sensors detect unauthorized opening of a door of the building, the base station can cause the outdoor camera to record video data, e.g., to hopefully capture a person exiting the building through the door. Thus, indoor and outdoor sensors can capture evidence, perform data analysis, etc. in response to alarm conditions detected at any location in or around a building.

In some embodiments, events detected by an outdoor camera can be assigned a risk score based on various criteria and events can be screened or identified for screening by monitoring personnel or a user based on the risk score. For example, the presence of a human detected by an outdoor camera at night may be assigned a higher risk score than the presence of a human during the day. Similarly, a human acting suspiciously regardless of the time of day such as hiding behind bushes or walking around a property multiple times in a few days can be assigned a higher risk score than arrival of a known delivery person carrying and leaving a package at the building five days a week. In some cases, higher risk scores can be assigned to events that tend to have a higher correlation to criminal activity than other events. Some criteria that can be factored into risk score assignment can include time of day an event is detected, crime statistics in the area local to the outdoor camera, recognition of a human that is authorized or not to be at the premises, how long an unknown person is detected to be at the premises, whether the event is known or predicted in advance of detection (e.g., a package delivery may be known to be occurring between 4-6 pm and receive a lower risk score than an unexpected delivery), whether a human is detected by multiple outdoor cameras and/or on multiple consecutive days or weeks, whether a human is detected by the outdoor camera along with other sensor data indicative of an alarm event (such as breaking glass), etc. An outdoor camera can be configured to assign risk scores to detected events, e.g., using artificial intelligence and/or other data analysis techniques, and can forward or otherwise recommend events along with related video data for screening by monitoring personnel and/or a user along with or based on an associated risk score. Alternately, or in addition, risk scores can be assigned by an alarm base station, monitoring server, a user, or other device or person. Risk scores can be used to rank or otherwise determine an order in which events are screened by monitoring personnel and/or a user, e.g., such that higher risk score events are reviewed by a person before lower risk score events even if the higher risk score events were detected later in time. As an example, a user interface dashboard used by monitoring personnel to screen event data can display higher risk event data in a foreground or otherwise more prominently than lower risk score event data. Risk scores can be used for other purposes, such as whether police and/or other authorities are notified automatically by a computer system, e.g., an event with a risk score over a threshold can cause notification of police before human screening, whether video data or other sensor data is stored and for how long, adjusting a countdown or delay time that a base station employs before entering an alarm state, whether a countdown chime or siren is displayed when a human is detected and before a user responds to a corresponding alert and/or an alarm system is disarmed, and so on.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Systems and methods described herein are described below by way of one or more illustrative embodiments. It should be understood that the illustrative embodiments described are not intended to be limiting, but rather to help show how one or more aspects may be implemented in a particular example. Also, features described herein may be implemented alone and/or in combination with other features.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1:
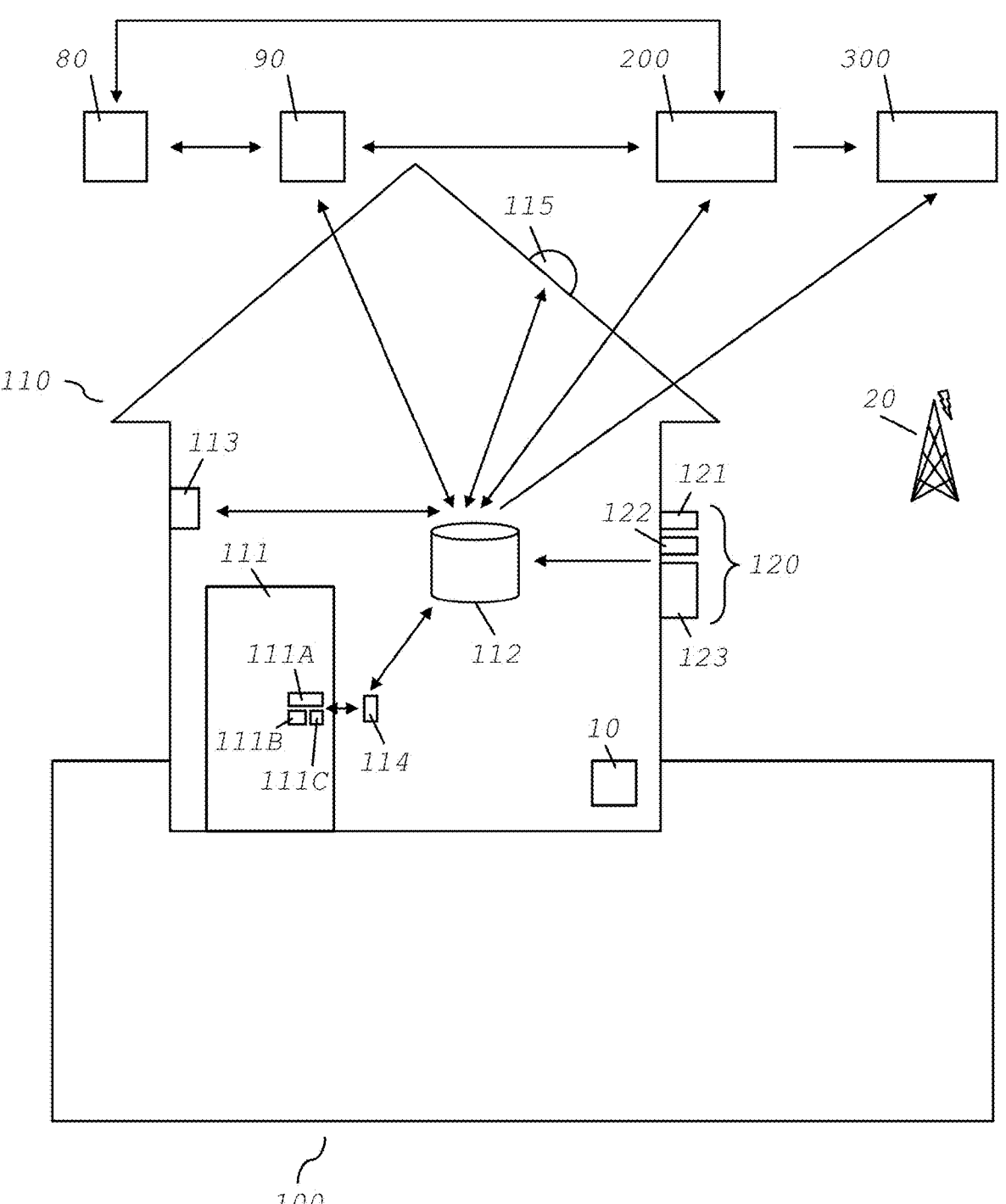
FIG. 1 is a schematic block diagram of an example of an outdoor camera integrated with an alarm system having one or more internal sensors.

FIG. 1 shows an illustrative arrangement including an alarm system that incorporates one or more features of systems and methods described herein. In this embodiment, a building 110 is located on a property 100. As used herein, the term "building" refers to any suitable structure that may be entered and/or exited by a person, such as a single family home, a single apartment in a multi-apartment complex, a warehouse or other industrial facility, one or more rooms or other spaces of a larger structure, and so on.

In this embodiment, the building 110 is equipped with an alarm system which may be used to monitor the building 110 as well as the property 100 for various conditions, such as the use of doors 111 to enter/exit the building 110, noise at the property 100, fire and/or smoke conditions at the property 100, movement of people or object at the property 100, abnormally high/low temperatures and/or water at the property 100. As is understood in the art, the alarm system may be employed to monitor conditions at the building as well as taking particular actions in response to sensed conditions, such as notifying authorities (e.g., police, fire, building management, etc.) of particular conditions, notifying a user of particular conditions, displaying an alarm (e.g., emitting siren noises and emergency lighting at the building, etc.), recording video and/or audio conditions at the building, and so on. Thus, although the system is referred to herein as an "alarm" system, the alarm system need not necessarily display alarm sounds or lights at the building, but instead may be employed only for monitoring conditions at the building and optionally reporting on monitored conditions.

In some embodiments, the alarm system is equipped with a base station 112, which coordinates communications with devices located at the building 110 and can also coordinate communications between the devices located at the building 110 and remote devices. As used herein, conditions or devices located "at" a building refers to the condition or devices being within and/or near the building, e.g., movement of persons "at" a building refers to movement of persons within and/or near the building. The base station 112 is shown as a single element, but may include two or more components, which may be located separately at the property 100 and/or remotely from the property 100. Thus, while in this embodiment the base station 112 is located at the building 110, the base station 112 may be located remotely from the building 110 at least in part, e.g., the base station 112 may be implemented at least in part at one or more computers or other data processing devices that are remote from the property 100. The base station 112 may be configured and arranged to communicate with any number and/or type of remote devices using any suitable communications channel (e.g., wireless, wired, Internet, cellular telephone, satellite, etc.). The base station 112 may also include one or more software components, such as artificial intelligence features to perform image analysis (such as facial recognition, movement detection, object recognition, etc.) or other processing functions (such as generating MPEG, JPEG or other image data structures, and so on). It should be understood that the components of the base station 112 shown in FIG. 1 are selected for purposes of explanation and that the base station 112 can include one or more other components for performing any suitable function.

In some embodiments, the alarm system also includes an internal sensor 113, which may be employed to detect conditions at the building 110. The internal sensor 113 is shown as a single element, but may include two or more components, or sensors which may be used to detect whether the door 111 is in an open or closed position, whether a window is open or closed, visual and/or audible detection of information at the building 110 such as the presence of persons or noise at the building 110, the motion of persons or objects, but not necessarily video information, noises such as breaking of glass, loud impacts such as hammering, talking by people etc., the presence of smoke (including carbon monoxide) and/or fire, the temperature and/or the presence of water in abnormal locations, and others. The base station 112 may be in communication with the internal sensor 113 and may be arranged to record sensor information, such as video or other data for later review by a user. Those of skill in the art will appreciate the variety of sensors that may be employed with an alarm system, and how the information detected by the sensors may be used, recorded or otherwise handled for use with the alarm system.

In some embodiments the base station 112 is equipped with a wifi access point, router and/or other gateway 10 to an Internet or other wide area network connection (such as a broadband modem) can have one or more components at the property 100 (such as a wifi router) and/or one or more remote components (such as a satellite-based wifi component). The gateway 10 provides a network connection for the internal sensor 113 and the base station 112 to the Internet or other wide area network, and so can provide a communications link to remote components of the building 110. Remote components can include a server 90, which can include multiple servers in distributed locations and/or other data processing and storage devices. The server 90 can provide various monitoring functions such as receiving data from the internal sensor 113 and/or the base station 112, controlling operation of the local components at the property 100, analyzing data from the base station 112 and other local components to assess whether an alarm condition is present or to assess other property conditions, notifying authorities (such as police or fire) regarding conditions at the property 100 which may need attention, etc. The server 90 can also provide information regarding the property 100 to, and receive instructions from, a user device 80 (often referred to herein more simply as a user, and can include a smartphone, computer, or other data processing device along with a suitable user interface to provide output (e.g., information display) and receive input (e.g., user commands)). In addition to being able to communicate with the server 90 via a network connection that includes the gateway 10, the base station 112 can communicate with the server 90 via a network that includes a cellular network 20. The cellular network 20 can be employed, for example, when the gateway-based network is not operable.

In some embodiments, the base station 112 is also configured and arranged to communicate with one or more monitoring server(s) 200 as well as authorities communication devices 300. The monitoring server(s) 200 may receive information and commands from the base station 112, such as alarm and other conditions sensed at the property 100, and take suitable action including sending information and commands to the base station 112, authorities communication devices 300, and others. For example, the base station 112 may send to the monitoring server(s) 200 information indicating an alarm condition related to unauthorized entry onto the property 100, and in response the monitoring server(s) 200 may notify authorities (e.g., fire, police, etc. via the authorities communication devices 300) of the alarm condition along with other information such as the suspected point of entry onto the property 100, etc. The monitoring server(s) 200 may notify a user of sensed conditions by communicating with a user 80. As with other communications between the base station 112 and remote devices, the monitoring server(s) 200 may communicate with other devices via any suitable communications network or other channel, such as wired or wireless networks, Internet, cellular telephone, satellite, etc.

The monitoring server(s) 200 may provide other functions as are known in the art. For example, the monitoring server(s) 200 may relay video and/or audio information received the property 100 to the user 80, which may display the video and/or audio information to the user 80. This may, for example, allow the user to observe and communicate with a visitor at the property 100 who is seeking entry to the property 100. The user 80 may also provide commands to the monitoring server(s) 200, such as instructions to cancel an alarm state at the property 100, and the monitoring sever(s) 200 may provide suitable commands to the base station 112 accordingly. In some embodiments the user 80 communicates with the base station 112 and other devices at the property 100 via the monitoring server(s) 200, and/or the user 80 may communicate more directly with the base station 112 and/or other devices at the property 100. As an example, the user 80 may communicate directly with an audio/video recording and display device (e.g., a camera, speaker and microphone that is part of a doorbell at the property 100) to receive audio/video data recorded from the property 100, as well as provide audio/video data for display at the property 100. Similarly, the base station 112 may communicate more directly with authorities communication devices 300 and/or other devices rather than via the monitoring server(s) 200. This may, for example, allow the base station 112 to relay alarm state messages to the authorities communication devices 300 even if communication with the monitoring server(s) 200 is interrupted.

The building 110 is further equipped with one or more doors 111 which may be used by persons to enter and/or exit the building 110 and one or more door locks 111A, which is configured to engage to lock an associated door 111 and to disengage to unlock the door 111. The door lock 111A may be configured to receive commands or other information, such as a command to move a bolt, latch or other mechanism to lock or unlock the associated door 111 in a closed position. In this embodiment, the door lock 111A may communicate with a lock server 111B to send and receive commands and other information. The lock server 111B may manage operation of the door lock 111A as well as communications with the user 80 to provide instructions for lock operation and/or to receive information from the door lock 111A, such as whether the door lock 111A is engaged to lock a door 111 or not. While in some embodiments the functions of the lock server 111B may be performed by the monitoring server(s) 200, in this embodiment the door lock 111A is capable of coordinating at least some of its functions with the base station 112 as described more below. Thus, a user, e.g., interacting with an application running on the user device 80, may provide instructions to the lock server 111B to lock or unlock the door 111 and/or receive information regarding door lock 111A status and other conditions, and the lock server 111B may provide suitable information or commands to the door lock 111A. The door lock 111A may communicate with the base station 112, either directly via a local network (e.g., Wi-Fi) or other communications channel, or more indirectly via the lock server 111B which may communicate with the monitoring server(s) 200 via the Internet or any other suitable communications network(s) or channels. Thus, the base station 112 may receive information from the door lock 111B, such as whether the door lock 111A is engaged or not to lock the door 111 in a closed position. The door 111 may further include a door sensor 111C that can detect whether the door 111 is in an open or closed position. The door sensor 111C may be part of the door lock 111A, or may be independent of the door lock 111A, such that the door sensor 111C communicates with the base station 112 whether an associated door 111 is open or closed. Therefore, the base station 112 may receive information regarding whether the door 111 is in an open or closed position as well as whether the door lock 111A is engaged or not to lock the door 111 in a closed position.

In some embodiments, the alarm system further includes one or more outdoor sensors, such as one or more cameras 120. The outdoor camera 120 is shown as a single element, but may include two or more components, which may be located separately or together at the property 100. In some embodiments, each camera comprises a motion sensor 121 which may detect motion of persons or objects but not necessarily detect video information, and an imaging device 123 which may detect visual and/or audio information at the property 100. (Herein, video data refers to visible or optical information and/or audible or sound information.) In some embodiments, the motion sensor 121 may include a passive infrared sensor, ultrasonic sensor or other device that can detect movement and/or the presence of various objects. The signal from such a motion sensor 121 can be used to activate the imaging device 123 if suitable motion has been detected. The outdoor camera 120 can include any suitable components for capturing image data, such as lenses, filters, a CMOS or other imaging device, a microphone to capture sound data that is combined with image data to form video image data, etc. as is known in the art. The outdoor camera 120 can also include one or more software components 122, such as artificial intelligence features to perform image or sound analysis (such as facial recognition, movement detection, object recognition, etc.) or other processing functions (such as generating MPEG, JPEG or other image data structures, and so on). It should be understood that the components of the outdoor camera 120 shown in FIG. 1 are selected for purposes of explanation and that the outdoor camera 120 can include one or more other components for performing any suitable function. In some embodiments, the outdoor camera 120 may include an image sensor, one or more filters (such as an IR cut filter), optical lens, a motor or other drive to control lens focusing or other operations, a light sensor or other exposure control system (ALS), and other components. As an example, the imaging device 123 can include infrared and/or visible light LEDs or other light emitters that can help illuminate an area at the property 100 for imaging purposes, such as illumination light, ranging or other distance determination, focusing operations, and so on. In some cases, light emitters can be used to illuminate an area near the imaging device 123 without imaging taking place, e.g., the outdoor camera 120 can operate as a spotlight. While example implementations described herein have generally been depicted in the context of wireless cameras, other embodiments are possible, and the beneficial systems and methods herein can be implemented in a variety of other devices that process and transmit data to connected devices, such as tablets, mobile devices, video gaming systems, communication devices, computer peripherals, audio equipment, etc. Additionally, while some example devices described herein are referred to as wireless, this is not intended to limit the claimed scope to require that no wires can be used to connect the devices to other things. For example, in some cases, some of the techniques and approaches described herein can be implemented in or with devices that receive power by a wired connection but transmit data wirelessly.

In some embodiments, the imaging device 123 of the outdoor camera 120 may be in a low power mode to conserve battery power in which all components of the imaging device 123 are disabled other than the communications components. In such embodiments, a signal from the motion sensor 121 may trigger imaging device 123 operation to capture image data. The base station 112 may also send an activation signal based on various criteria, such as information received from the property 100 (opening of a door, etc.), or receipt of an activation signal by the base station 112 from the monitoring server(s) 200 and/or user 80. An activation signal from the monitoring server(s) 200 and/or the user 80 and/or the monitoring can be prompted for various reasons, such as a user wishes to view an area of interest, some condition detected by the monitoring server(s)

200 at the property 100 requires activation of the imaging device 123 (such as inoperability of a network connection between the imaging device 123 and the monitoring server(s) 200) and others.

Each outdoor camera 120 may communicate information about detected motion and recordings directly to the base station 112. Alternatively, or in addition, each outdoor camera 120 may communicate directly to the monitoring server(s) 200, i.e., without routing the image data through the base station 112. This can enable faster transmission to the monitoring server(s) 200, e.g., allowing a user 80 to view real-time video at the property 100, while freeing the base station 112 from handling any image data flows to the monitoring server(s) 200. As a result, the base station 112 can be more available for its critical functions, such as detecting alarm events and notifying the monitoring server(s) 200 of them. Where a first network connection between the camera 120 and the monitoring server(s) 200 is inoperable, there may still be a need for at least some video image data to be transmitted to the monitoring server(s) 200. For example, there can be an alarm condition at the property 100, such as a detected broken window or forced door opening during a failure of a network connection, and transmission of at least one image frame (or still image) from video image data captured by the imaging device 123 can be useful to determine whether a person is involved with the alarm event and if so, the identity of the person. In some cases, the base station 112 may have a secret alert function where if one or more conditions at the property 100 are detected (e.g., movement around a house), the base station 112 can activate one or more cameras 122 to record and send video image data without notifying authorities or otherwise triggering an alarm state. This may allow a user to be notified of the activity at the property 100 without triggering an alarm state and attendant siren noise, notifying authorities, etc. The base station may also coordinate communications between the outdoor camera 120 and the internal sensor 113 to track the motion of a human or a dangerous event (e.g., fire, smoke, or water) throughout the building 110 and property 100. As an example, the outdoor camera 120 may identify a human entering a door of the building, and the base station 112 can use indoor sensors to follow movement of the human through the building. The base station 112 may further activate either the outdoor camera 120 or the internal sensor 113 in response to detected signals from either the outdoor camera 120 or the internal sensor 113. For example, if a glass breakage sensor is set off in the building 110 indicating that a window has been broken, the base station 112 may cause the outdoor camera 120 to record image data near the window, e.g., to verify if the responsible party was a tree branch that may have been moving around the property 100 due to excessive wind conditions, or if the responsible party was a suspicious visitor. The collaboration of the outdoor camera 120 and the internal sensor 113 via the base station 112 may allow the alarm system to more robustly monitor the entire building 110 and property 100 by cross-referencing signals and detected events.

Image data can be sent from the camera 120 to the base station 112 in different ways, e.g., a wifi network connection through the gateway 10, the cellular network 20, or a sub-GHz communications module. A communications link between the camera 120 and the base station 112 for sending image data, or a network connection between the base station 112 and the monitoring server(s) 200 can have a relatively small maximum bandwidth or other ability to send large amounts of data in a rapid fashion. In such case, a portion of the video image data can be selected for sending from the camera 120 to the base station 112 and/or from the base station 112 to the monitoring server(s) 200.

In some embodiments, the outdoor camera 120 can identify and select a portion of the motion sensor data or video image data for sending to the user, base station 112 and/or monitoring server 200 based on analysis of the image data. As an example, the software components 122 of the outdoor camera 120 may identify one or more image frames that include a recognizable or recognized face, and send that selected image frame to the user, base station 112 and/or monitoring server 200. Detected events and related video data can be identified for reporting or other notification in other ways, such as by identifying frames that have a person, animal, pet, object, text, or some other feature that suggests the event should be screened by a person or not, and/or of some other action should be taken such as notifying authorities. In some embodiments, the camera 120 can determine a risk score for each detected event, e.g., that represents a likelihood that the event may be connected to actual or future criminal activity. Risk scores can be used by the camera 120 to determine whether an event is sent to a user of the monitoring server 200 for assessment and/or what video data should be sent. As an example, detection of a known human at a building may prompt the camera 120 to send a single still image of the face of the known human to the user along with a relatively low risk score, whereas detection of an unknown human may prompt the camera 120 to send a longer video clip to the user and the monitoring server 200 along with a relatively high risk score. Events with risk scores over a threshold may require screening by monitoring personnel, whereas lower risk score events may not be screened at all, and/or events may be screened in an order or hierarchy according to risk score (rather than time of detection). Some criteria that can be factored into risk score assignment can include time of day an event is detected, crime statistics in the area local to the outdoor camera, recognition of a human that is authorized or not to be at the premises, how long an unknown person is detected to be at the premises, whether the event is known or predicted in advance of detection (e.g., a package delivery may be known to be occurring between 4-6 pm and receive a lower risk score than an unexpected delivery), whether a human is detected by multiple outdoor cameras and/or on multiple consecutive days or weeks, whether a human is detected by the outdoor camera along with other sensor data indicative of an alarm event (such as breaking glass), etc. A camera 120 can be configured to assign risk scores to detected events, e.g., using artificial intelligence and/or other data analysis techniques, and can forward or otherwise recommend events along with related video data for screening by monitoring personnel and/or a user along with or based on an associated risk score. Alternately, or in addition, risk scores can be assigned by an alarm base station, monitoring server, a user, or other device or person. Risk scores can be used to rank or otherwise determine an order in which events are screened by monitoring personnel and/or a user, e.g., such that higher risk score events are reviewed by a person before lower risk score events even if the higher risk score events were detected later in time. As an example, a user interface dashboard used by monitoring personnel to screen event data can display higher risk event data in a foreground or otherwise more prominently than lower risk score event data. Risk scores can be used for other purposes, such as whether police and/or other authorities are notified automatically by a computer system, e.g., an event with a risk score over a threshold can cause notification of police before human screening, whether video data or other sensor data is stored and for how long, adjusting a countdown or delay time that a base station employs before entering an alarm state, whether a countdown chime or siren is displayed when a human is detected and before a user responds to a corresponding alert and/or an alarm system is disarmed, and so on. In some embodiments, audio data that is part of the video data can be used to analyze or select one or more image frames, such as a set of images corresponding to a time during which glass breakage is detected, or when a person is heard talking. In other embodiments, the base station 112 can analyze and select one or more image frames from video data received from the camera 120, whether the camera 120 has sent a full set of image frames or sent a selected set of images to the base station 112. The software components of the base station 112 may use image analysis or any other suitable technique to identify portions of video image data for sending to the monitoring server(s) 200.

The software components 122 of the outdoor camera 120 may also determine whether a detected signal from the motion sensor 121 at the property 100 is from a human visitor or not, and based on the analysis, adjust the frequency of activation events and/or video data captured and sent for review by the user, monitoring server(s) 200 or the base station 112. The software components 122 of the outdoor camera 120 may further distinguish the source of the detected motion by the motion sensor 121 and video data collected by the imaging device 123 by using artificial intelligence features and certain logical operations. For example, the software components 122 of the outdoor camera 120 may be able to recognize that a visitor at the property 100 is a delivery person based upon the external recognition of the visitor and the path that the visitor takes at the property and not report the event to the base station 112 during the daytime. The decision not to report may be based on a relatively low risk score assigned to the event by the camera 120. However, if such an event occurred at night the software components 122 of the outdoor camera 120 may flag the event (e.g., with a relatively high risk score) and notify the user, base station 112 or the monitoring server(s) 200, e.g., because such visitors are less likely at night. As another example, the outdoor camera 120 may be aware of the weather at the property 100 due to information passed on by the base station or sensors embedded in the outdoor camera 120. With this environmental information, the outdoor camera 120 may raise a higher priority alert to the base station 112 if a person is detected with an umbrella at property on a sunny day versus a rainy day, when it is more likely that visitors may be carrying umbrellas. The classification of events by the software components of the outdoor camera 120 also may enhance the privacy of the alarm system by reducing the total amount of recordings transferred over wireless connections to the base station 112 or the monitoring server(s) 200. The camera may retain information (such as image video and/or audio from the imaging device 123 or motion signals from the motion sensor 121) from events that do not trigger review (e.g., because of a low risk score) by the user, base station 112 or the monitoring server(s) 200 in an encrypted local storage drive, which may be accessible at a later date for further review or reference.

The software components 122 of the outdoor camera 120 may further be able to distinguish whether the human visitor at the property 100 is a known visitor, using facial recognition or geo-fencing capabilities, wherein signals from the known visitor's location-aware device, for example a cellular telephone, may be cross-referenced with a list of approved visitors by the user 80 and would trigger a different response to the base station 112 than an unknown visitor. By conducting at least some image analysis at the source of the detection, for example at the outdoor camera 120 by the software components 122, the alarm system may filter out many of the false positives of the detected events associated with monitoring an outdoor property, which may be exposed to more visitors than an indoor property, such as the inside of a house. Moreover, by reporting events along with and/or based on a risk score that attempts to categorize the event according to risk of criminal activity or risk to life and property, the camera 120 can help ensure that higher risk events are reported and/or screened more rapidly and have suitable and prompt emergency response.

The alarm system may also include a keypad 114 to provide information to and/or receive information from the base station 112. For example, the keypad 114 may have a number pad or other arrangement to allow a user to enter an alphanumeric string or other code to the base station 112, e.g., to place the base station 112 in an armed or disarmed state, to configure the alarm system in one or more ways, to silence or initiate an alarm state, to communicate with the monitoring server(s) 200 and/or authorities communication devices 300, to provide a code to the door lock 111A to unlock an entry door, etc. As an example, if a user enters the building 110 while the alarm system is in an armed state, the user may employ the keypad 114 to enter an entry code or other information to prevent the alarm system from indicating an alarm state, e.g., in which authorities are notified of an alarm condition. One or more keypads 114 may be provided within or outside of the building 110, as desired. In addition, or alternately, a user may interact with the base station 112 via the user device 80, e.g., a keypad 114 may be implemented via a user interface on the user device 80.

In some embodiments, the alarm system may be arranged to enter an armed state and a door lock 111A engaged to lock an associated door 111 in response to a user pressing a single button, e.g., on a keypad 114, and/or in response to use of a specific code, e.g., to gain access to the building 110 or property 100. As an example, a user may press a single button on a keypad 114 after entering the property 100 so that the base station 112 enters an armed state (e.g., a home mode) and one or more door locks 111A are engaged to lock their associated doors 111 in a closed position. Where door locks 111A are not fully integrated with the alarm system, the base station 112 may send a signal to the door lock(s) 111A at the property 100 instructing the door lock(s) 111A to engage to lock their associated doors 111 in response to button press on the key pad 114. Such a signal may be sent directly from the base station 112 to the door lock(s) 111A, or via the monitoring server(s) 200, lock server 111, and/or other devices via any set of suitable communication channels. Such an arrangement may allow a user to easily and rapidly re-arm an alarm system as well as lock any unlocked doors in a single action.

As another example, a user may enter a particular code into a keypad 114 to gain access to the property 100 (e.g., to place the base station 112 in a disarmed state so doors can be opened without triggering an alarm condition and/or to unlock an entry door) and thereafter the base station 112 may automatically enter an armed state and one or more door locks 111A may automatically engage to lock their respective doors 111. These rearming and lock engagement features may be activated automatically without further action required by the user and may allow for easier and more foolproof arming of an alarm system and locking of doors for particular users. As an example, a child may be associated with a specific code to gain access to a property 100. Thus, the child may use the code, e.g., with a keypad 114, keyfob, or user device 80, to cause the base station 112 to enter a disarmed state and/or to unlock an entry door 111 so the child can enter the property 100 without triggering an alarm condition. Thereafter, the base station 112 may enter an armed state and door locks 111A may engage to lock respective doors 111, e.g., after a period of time has elapsed since the code was used, after a door 111 was opened and closed by the entering child, or other condition that indicates the child has entered the building 110 and the alarm system can be rearmed and doors locked. This may help ensure that an alarm system is armed and doors locked after a child has returned home, thereby avoiding any potential problem that a child may forget to lock doors and rearm the alarm system. Of course, these features may be employed for any user, regardless of the user's age.

As another example, use of a single button by a user whether on a keypad 114, user device 80 or other user interface with the base station 112 or door lock 111A may allow a user to more simply and reliably both arm an alarm system and lock doors of a property 100. This feature may be particularly useful if door locks 111A at the building 110 are not fully integrated with the alarm system. That is, door locks 111A may be provided separately from an alarm system, and may be operated independently of the alarm system. For example, a user may enjoy regular use of remote activated door locks 111A via a user device 80 and the lock server 111B, but may use an alarm system less frequently. Thus, a user may interact with the alarm system less than the door lock system, and the door lock system may have a completely separate interface (whether on the user device 80 or other interface) than the alarm system. By providing the user with a single button to both arm an alarm system and lock building doors, the user may be ensured that both functions are employed. As an example, the user interface on the user device 80 for the door lock 111A (or the alarm system) may include a single button (via touch screen or other interface like a keypad 114) that a user can activate to arm the alarm and lock doors. The user may receive feedback from the base station 112 and the door locks 111A that the alarm system is suitably armed and doors locked, all in response to a single action by the user.

Figure 2:
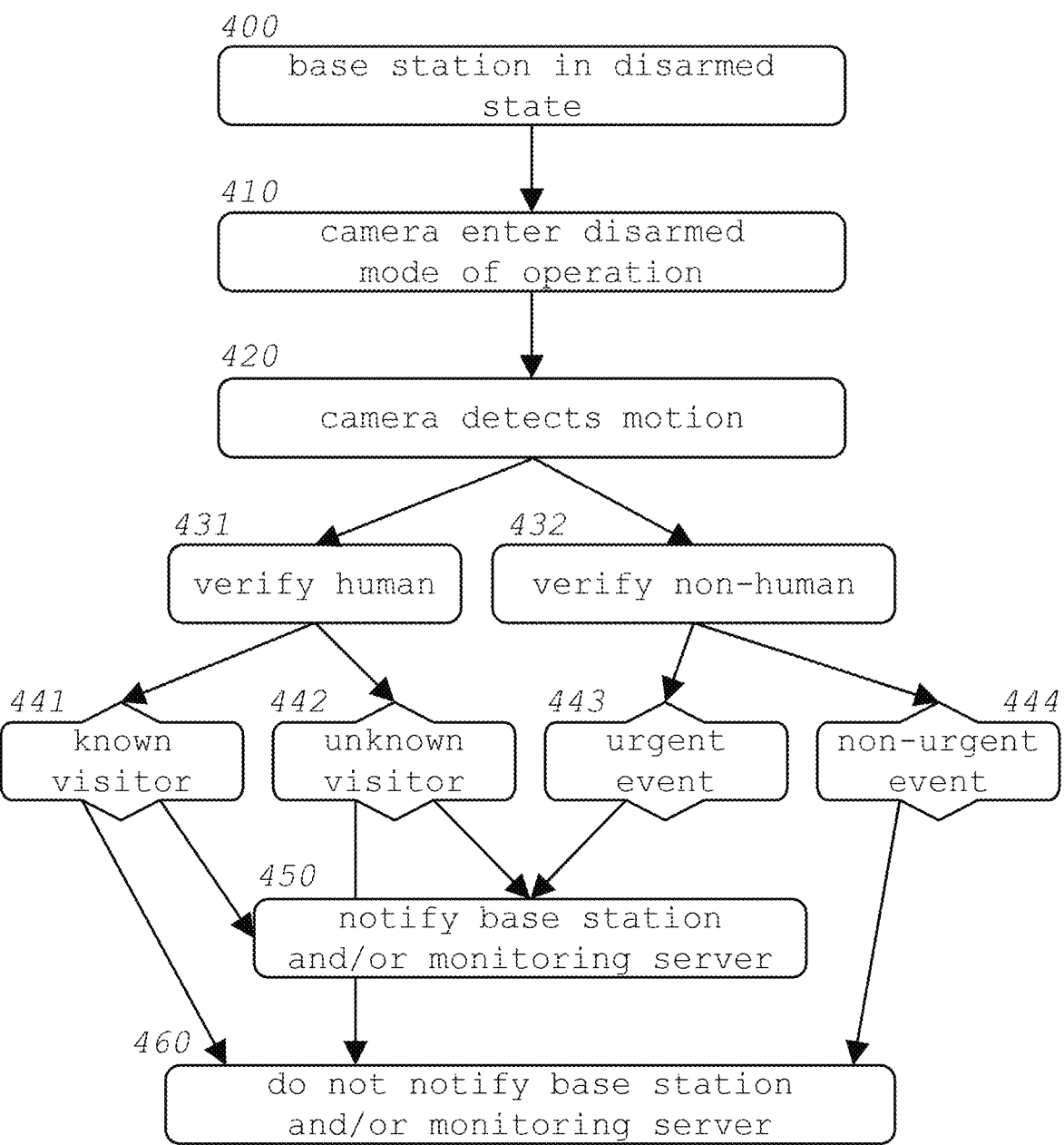
FIG. 2 is a flow chart of an example process for generating an alarm when the alarm system is in a disarmed state.

FIG. 2 is a diagrammatic flow chart depicting some embodiments of the alarm system in the disarmed state. In some embodiments, when the base station 112 has entered a disarmed state 400 by command of a user device 80, the outdoor camera 120 may enter a disarmed mode of operation 410. In this disarmed mode of operation 410, the outdoor camera 120 may continue to monitor for activity 420 at the property 100 but only notify the base station 112 of the activity if it has been deemed suspicious 450, e.g., is assigned a risk score over a threshold. The outdoor camera 120 may continue to recognize activity related to debris blown through the property by wind or wild animals and/or pets, 444 but only capture image video data and/or notify the user if the detected event has passed a threshold of urgency as determined by the disarmed mode of operation. For example, if the outdoor camera 120 detects a large tree branch at the property but recognizes that the tree branch is moving erratically due to known environmental condition (for example excessive wind), the outdoor camera 120 may alert the user or base station 112. The outdoor camera 120 may also continue to monitor for human activity 431 at the property 100, but may use its software capabilities 122 to reduce the number of reported events of normal human activity to the base station 112. For example, if the base station 112 is in a disarmed state while the user and known personnel (e.g., family) are traversing the property 100, the outdoor camera 120 would not notify the user or base station 112 of humans 460 at the property 100. In this example, the outdoor camera 120 may not report the known humans at the property due to any combination of the following: the recognition of their faces, the sensing of their devices via geofencing, or lack of suspicious movement or behavior.

However, even when the base station 112 is in a disarmed state, the outdoor camera 120 may continue to report suspicious human behavior which may pose a threat, characterized by erratic or urgent behavior, to the base station 112. For example, the outdoor camera 120 would use the software capabilities 122, which may include tracking, to recognize if an unknown human at the property 100 is just passing by on the sidewalk or if the unknown human is lurking or suspiciously moving around the property 100. Additionally, the outdoor camera 120 may report known human detection events to the base station 112 or the monitoring server(s) 200 if a known human (recognized by the software capabilities 122 of the outdoor camera 120) is exhibiting unexpected behavior. For example, the outdoor camera 120 would use the software capabilities 122, which may include tracking, to recognize if the known human is exhibiting behaviors that necessitate medical attention, for example a heart attack or a serious fall. Furthermore, if the base station 112 is in a disarmed state, the outdoor camera 120 may still notify the base station 112 of urgent external events 443, for example, fires, falling trees, gunshots, or an automobile accident at the property 100. Depending on the urgency of the detected event, either the base station 112 or the outdoor camera 120 may report the event to the monitoring server(s) 200 and/or the user device 80. Such reporting can be accompanied by a risk score assigned by the camera 120, and a user and/or personnel at the monitoring server 200 may be prompted to review or otherwise screen event data according to the risk score, e.g., with higher risk score events being reviewed before lower risk score events.

Figure 3:
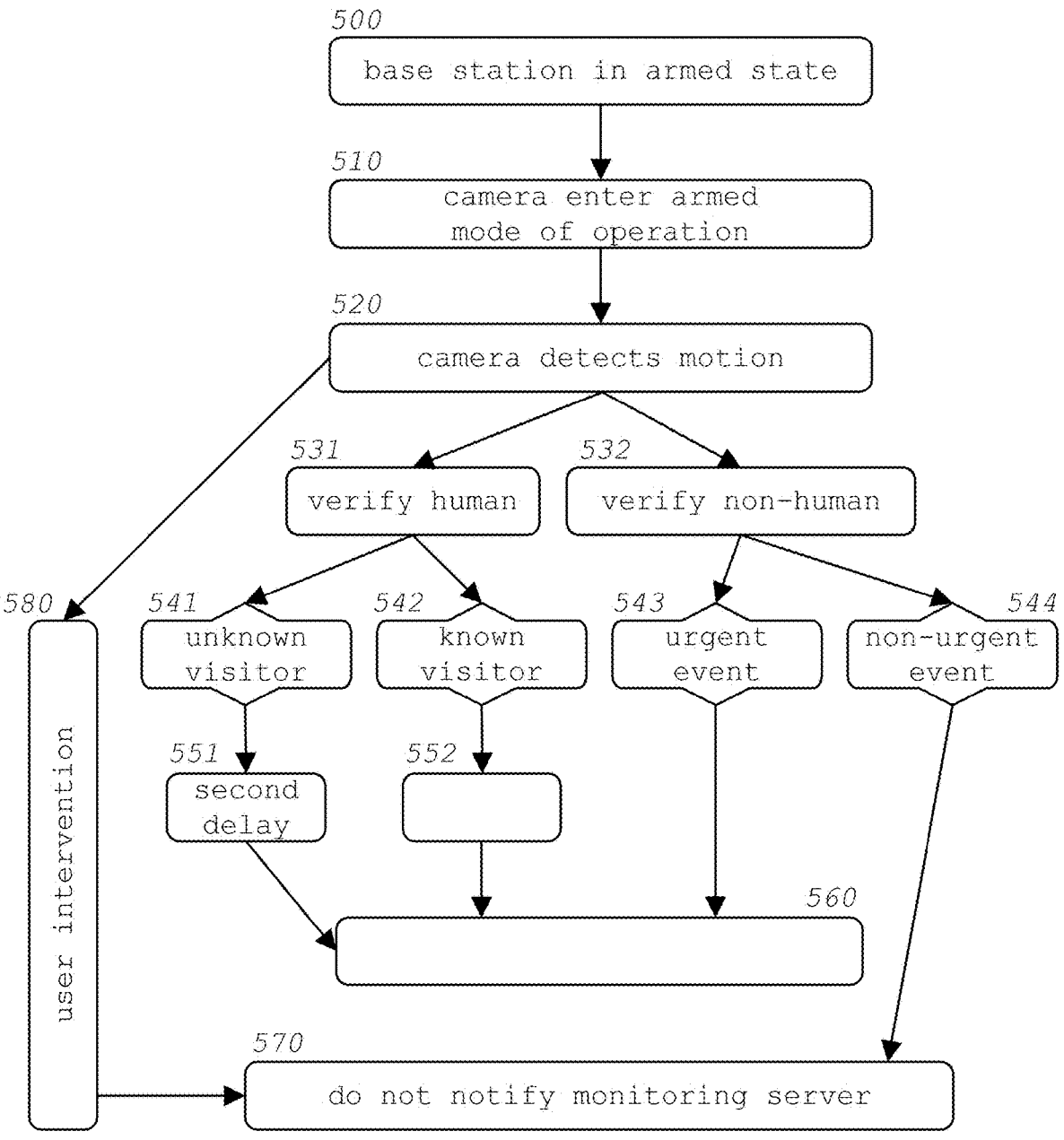
FIG. 3 is a flow chart of an example process for generating an alarm when the alarm system is in an armed state.

FIG. 3 is a diagrammatic flow chart depicting some embodiments of the alarm system in the armed state. In some embodiments, when the base station 112 has entered an armed state 500 by command of a user device 80, the outdoor camera 120 may enter an armed mode of operation 510. In this armed mode of operation 510, the camera may report any human or non-human activity at the property 100. The outdoor camera 120 may continue to recognize non-urgent and non-human activity at the property 100, e.g., related to debris blown through the property by wind, wild animals and/or pets, 544 but only capture image video data and/or notify the base station or user if the detected event has passed a threshold of urgency as determined by the armed mode of operation, e.g., if the event is assigned a risk score over a threshold. However, if the outdoor camera 120 has recognized human activity at the property 100, the software capabilities 122 of the outdoor camera 120 may provide further information to the base station 112 in combination with image data from the imaging sensor 123. For example, the software capabilities 122 of the camera may be able to detect if the visitor is human 531 and whether the human is known 542 or unknown 541, as described previously.

If the human visitor is determined to be known 542, then the outdoor camera 120 communicates the distinction of a known visitor to the user or base station 112, e.g., along with a corresponding risk score for the event. The base station may then employ a first delay 552 from when the known human was detected before communicating the detected event to the monitoring server(s) 200 or the user device 80, or employ the first delay to allow a user to respond to an alert regarding the recognized human. As an example, the first delay may be employed from when a door is opened at the building until the alarm system is disarmed. During this first delay, the user or known human can have the opportunity to disarm the alarm system 580, which may occur by entering a particular code into the keypad 114 or by disarming the alarm system by a user interface on the user device 80, so that an alarm state is not entered and/or the monitoring server(s) 200 are not notified 570. The first delay may be between 30 seconds and one minute, for example. The camera 120 or other part of the alarm system can display a countdown chime or other audible and/or visual message that indicates that the first delay has been implemented. If the user does not or is not able to disarm the alarm system or otherwise respond to an alert in the allotted first delay, then an alarm state may be entered and an alert may be passed on 560 to the monitoring server(s) 200. Alternatively, the alert may be communicated simultaneously to the user 80 and the monitoring server(s) 200 for efficiency. The monitoring server(s) 200, e.g., personnel at the monitoring server, may communicate with the known human visitor at the property 100 to determine the reason why the alarm system had not been disarmed in the allotted time or take other suitable action. For example, the known human visitor may have entered the property 100 carrying a damaged box that spilled its contents right as the known human visitor was about to disarm the alarm system. With the attention of the known human visitor now turned to the spillage, the first delay may have passed without any disarming of the system. At this point, the user or monitoring server(s) 200 may be notified by the base station 112 and may use a speaker and microphone or other means of communication to directly communicate with the visitor at the property to verify the situation and disarm the alarm system. Alternatively, the user or monitoring server(s) 200 may use the speaker or microphone with the outdoor camera 120 to determine that the known human visitor did not disarm the alarm system during the first delay due to an urgent medical condition. The monitoring server(s) 200 may then alert the appropriate emergency response. As described previously, the outdoor camera 120 may alternatively be able to determine if the human visitor is exhibiting unexpected behavior and directly communicate the detected event to the base station 112 or the monitoring server(s) 200 based on the urgency of the detected event.

Figure 4:
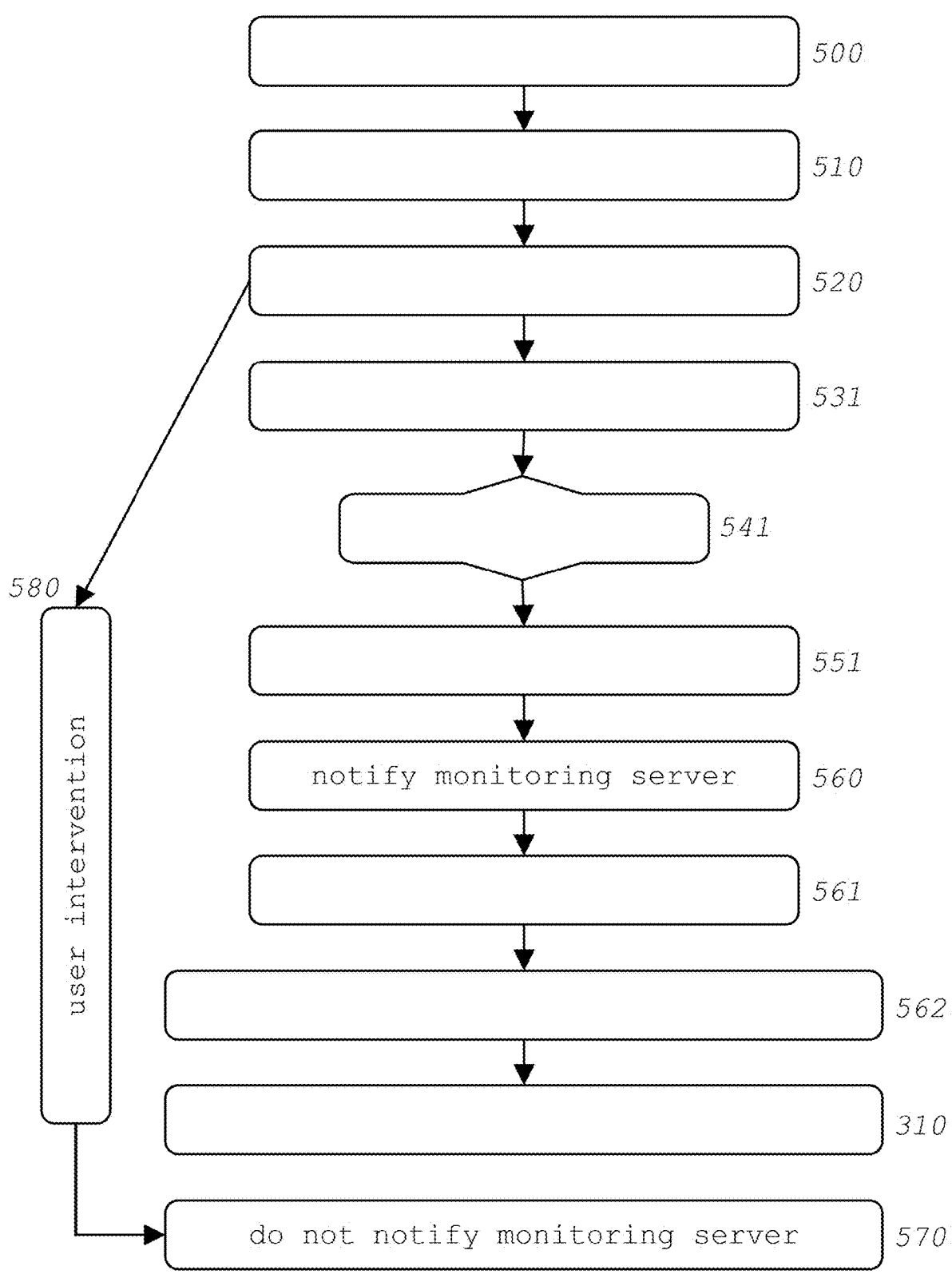
FIG. 4 is a flow chart of an example process for generating an alarm when the alarm system is in an armed state and an unknown human visitor has been detected.

FIG. 4 is a diagrammatic flow chart depicting some embodiments of the alarm system in the armed state responding to an unknown human visitor. If the human visitor is determined to be unknown by the outdoor camera 541, then the outdoor camera 120 communicates the distinction of an unknown visitor to the base station 112, e.g., along with a relatively high risk score. The base station may then employ a second delay 551 from when the known human was detected before communicating the detected event to the monitoring server(s) 200 or the user device 80, or communicate the event to the user and employ the second delay for response from the user to the alert and/or disarming of the alarm system. As an example, the second delay may be employed from when a door is opened at the building until the alarm system is disarmed. During this second delay, the user or unknown human has the opportunity to disarm the alarm system 580, which may occur by entering a particular code into the keypad 114 or by disarming the alarm system by a user interface on the user device 80, so that the user or monitoring server(s) 200 are not notified 570. The second delay may be shorter than the first delay and may be between 15 seconds and one minute, for example. The camera 120 or other portion of the alarm system can display a countdown chime or other indication that the second delay has been implemented. If the unknown human visitor does not or is not able to disarm the alarm system in the allotted first delay, then an alert may be passed on 560 to the user or monitoring server(s) 200. Alternatively, the alert may be communicated simultaneously to the user 80 and the monitoring server(s) 200 for efficiency. The user and/or personnel at the monitoring server 200 can be prompted to review the event data according to a risk score assigned by the camera 120, base station 112, monitoring server 200 and/or user, e.g., so higher risk score events are reviewed before lower risk score events. The user or monitoring server(s) 200 may use a speaker and microphone or other means of communication to directly communicate with the visitor 561 at the property to verify the situation and disarm the alarm system or alert the appropriate emergency response 310. For example, if an unknown human visitor trespasses the property 100 or otherwise attempts to enter the building 110 for longer than the second delay when the alarm system is in the armed state, then the camera 120, base station 112 and/or monitoring server(s) 200 may provide visual and audible warnings to the unknown human visitor to vacate the premise. Depending on the information received from the outdoor camera 120, the monitoring server(s) 200 may choose to alert the appropriate emergency response 310 without communicating with the unknown human visitor. Alternatively, the initiation of the emergency response may be accompanied with activation of a siren 115 shown in FIG. 1 at the property 100, which may make audible sounds such as to indicate an alarm condition and/or display emergency lighting at the property 100.

If the unknown human visitor enters the building without disarming the alarm system (for example, by breaking a window), then the internal sensor 113 may be able to coordinate with the outdoor camera 120 through the base station 112 to determine the path of the unknown human visitor 562 throughout both the property 100 and the building 110. If the outdoor camera 120 had not captured the unexpected entry of the unknown human visitor to the building 110, then communication with the base station 112 and the internal sensor 113 may provide information about where the unknown human visitor would exit the building 110, and the outdoor camera 120 may then be able to capture more information about the unknown human visitor in case the authorities do not arrive at the property 100 in time to catch the unknown human visitor. Alternatively, the coordination between the internal sensor 113 and the outdoor camera 120 may provide detailed information to the monitoring server(s) 200 that may be passed on to the authorities communication device 300 so that the authorities may know more precisely where in the building 110 or property 100 the unknown human visitor may be located.

In any embodiment, the first delay is longer than the second delay based upon the recognition of known human visitors by the software capabilities 122 of the outdoor camera 120 and/or based on different risk scores assigned to the two events. When the human visitors are known, the alarm system provides more time to disarm and/or more time before the monitoring server(s) 200 are notified than when the human visitors are unknown. The reduction of alerts to the monitoring server(s) 200 is facilitated by the analysis and filtering abilities of the software capabilities 122 of the outdoor camera 120. When the human visitors are unknown, the alarm system provides a shorter delay to disarm and/or less time before the monitoring server(s) 200 are notified as there is a higher likelihood of danger for the property 100. In all embodiments, the user 80 may disarm any alert or request an appropriate emergency response during either the first delay or the second delay or after an alert has been passed on to the monitoring server(s) 200.

For any state of the alarm system (for example armed or disarmed), certain sensors and capabilities of the internal sensor 113 and the outdoor camera 120 may be continuously active. For example, sensors relating to water damage, fire, and glass or window breakage may be active regardless of whether the alarm system is armed or disarmed.

Each of the components in FIGS. 1-4 may be implemented, at least in part, by a suitably programmed computer or other data processor, and may be employed in the form of software modules, ASICs, programmable arrays, or any other suitable arrangement, in addition to hardware components. For example, computer-implemented portions of the base station 112, door lock 111A, monitoring server(s) 200, authorities communication devices 300, lock server 111B, etc. may be implemented at least in part as single special purpose integrated circuits (e.g., ASICs), or an array of ASICs, each having a main or central processor section for overall, system-level control and separate sections dedicated to performing various different specific computations, functions and other processes under the control of the central processor section, as a plurality of separate dedicated programmable integrated or other electronic circuits or devices, e.g., hardwired electronic or logic circuits, such as discrete element circuits or programmable logic devices, as a programmed general purpose computer and/or other data processing device along with suitable software or other operating instructions, one or more memories (including non-transient storage media that may store software and/or other operating instructions), and so on. The devices may also include other components, such as an information display device, user input devices (such as a keyboard, user pointing device, touch screen or other user interface), data storage devices, communication devices, a power supply for the control circuitry and/or other system components, temperature and liquid level sensors, pressure sensors, RFID interrogation devices or other machine readable indicia readers (such as those used to read and recognize alphanumeric text, barcodes, security inks, etc.), video recording devices, speakers or other sound emitting devices, input/output interfaces (e.g., such as the user interface to display information to a user and/or receive input from a user), communication buses or other links, a display, switches, relays, triacs, motors, mechanical linkages and/or actuators, or other components necessary to perform desired input/output or other functions.

While aspects have been described with reference to various illustrative embodiments, such aspects are not limited to the embodiments described. Thus, it is evident that many alternatives, modifications, and variations of the embodiments described will be apparent to those skilled in the art. Accordingly, embodiments as set forth herein are intended to be illustrative, not limiting.

The invention claimed is:

1. A method, comprising:
determining, by a computing system, that a motion event occurred at a property;
receiving, by the computing system, data acquired by a camera monitoring the property;
determining, by the computing system and using the data, that a visitor on the property is a delivery person based on at least one external feature of the visitor;
determining, by the computing system, a risk score representing a likelihood that the motion event is related to criminal activity, wherein the risk score is based at least in part on (i) the visitor having been determined to be a delivery person, (ii) a length of time the visitor has been present at the property, and (iii) a time of day; and
causing, by the computing system and based at least in part on the risk score satisfying a threshold, a notification to be sent to an endpoint device.

2. The method of claim 1, further comprising:
performing, by the computing system, recognition processing using the data to recognize the at least one external feature of the visitor.

3. The method of claim 2, wherein the recognition processing includes facial recognition processing.

4. The method of claim 1, further comprising:
determining, by the computing system, a path that the visitor takes at the property;
wherein determining that the visitor is a delivery person is based at least in part on the path.

5. The method of claim 1, wherein the computing system is a component of the camera.

6. The method of claim 1, wherein the risk score is further based on a path the visitor takes at the property.

7. The method of claim 1, wherein the risk score is further based on information received from one or more sensors at the property other than the camera.

8. A system, comprising:
one or more processors; and
one or more computer-readable mediums encoded with instructions which, when executed by the one or more processors, cause the system to:
determine that a motion event occurred at a property;
receive data acquired by a camera monitoring the property;
determine, using the data, that a visitor on the property is a delivery person based on at least one external feature of the visitor;
determine a risk score representing a likelihood that the motion event is related to criminal activity, wherein the risk score is based at least in part on (i) the visitor having been determined to be a delivery person, (ii) a length of time the visitor has been present at the property, and (iii) a time of day; and
based at least in part on the risk score satisfying a threshold, cause a notification to be sent to an endpoint device.

9. The system of claim 8, wherein the one or more computer-readable mediums are further encoded with additional instructions which, when executed by the one or more processors, further cause the system to:
perform recognition processing using the data to recognize the at least one external feature of the visitor.

10. The system of claim 9, wherein the recognition processing includes facial recognition processing.

11. The system of claim 8, wherein the one or more computer-readable mediums are further encoded with additional instructions which, when executed by the one or more processors, further cause the system to:
determine a path that the visitor takes at the property; and
determine that the visitor is a delivery person based at least in part on the path.

12. The system of claim 8, wherein the one or more computer-readable mediums are further encoded with additional instructions which, when executed by the one or more processors, further cause the system to:
determine the risk score so that the risk score is further based on a path the visitor takes at the property.

13. The system of claim 8, wherein the one or more computer-readable mediums are further encoded with additional instructions which, when executed by the one or more processors, further cause the system to:

determine the risk score so that the risk score is further based on information received from one or more sensors at the property other than the camera.

14. One or more non-transitory computer-readable mediums encoded with instructions which, when executed by one or more processors of a system, cause the system to:

determine that a motion event occurred at a property;

receive data acquired by a camera monitoring the property;

determine, using the data, that a visitor on the property is a delivery person based on at least one external feature of the visitor;

determine a risk score representing a likelihood that the motion event is related to criminal activity, wherein the risk score is based at least in part on (i) the visitor having been determined to be a delivery person, (ii) a length of time the visitor has been present at the property, and (iii) a time of day; and based at least in part on the risk score satisfying a threshold, cause a notification to be sent to an endpoint device.

15. The one or more non-transitory computer-readable mediums of claim 14, further encoded with additional instructions which, when executed by the one or more processors, further cause the system to:

perform recognition processing using the data to recognize the at least one external feature of the visitor.

16. The one or more non-transitory computer-readable mediums of claim 15, wherein the recognition processing includes facial recognition processing.

17. The one or more non-transitory computer-readable mediums of claim 14, further encoded with additional instructions which, when executed by the one or more processors, further cause the system to:

determine a path that the visitor takes at the property; and determine that the visitor is a delivery person based at least in part on the path.

18. The one or more non-transitory computer-readable mediums of claim 14, further encoded with additional instructions which, when executed by the one or more processors, further cause the system to:

determine the risk score so that the risk score is further based on a path the visitor takes at the property.

19. The one or more non-transitory computer-readable mediums of claim 18, further encoded with additional instructions which, when executed by the one or more processors, further cause the system to: determine the risk score so that the risk score is further based on information received from one or more sensors at the property other than the camera.

* * * * *